United States Patent
Bhorkar et al.

(10) Patent No.: US 9,788,212 B2
(45) Date of Patent: Oct. 10, 2017

(54) SUBFRAME ALIGNED LISTEN-BEFORE-TALK FOR CELLULAR IN UNLICENSED BAND

(71) Applicant: Intel IP Corporation, Santa Clara, CA (US)

(72) Inventors: Abhijeet Bhorkar, Fremont, CA (US); Hwan-Joon Kwon, Santa Clara, CA (US); Christian Ibars Casas, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/085,340

(22) Filed: Mar. 30, 2016

(65) Prior Publication Data

US 2016/0309334 A1 Oct. 20, 2016

Related U.S. Application Data

(63) Continuation of application No. 14/711,278, filed on May 13, 2015, now Pat. No. 9,326,157.

(Continued)

(51) Int. Cl.
*H04W 72/00* (2009.01)
*H04W 16/14* (2009.01)
*H04L 1/18* (2006.01)
*H04W 72/12* (2009.01)
*H04W 74/08* (2009.01)
(Continued)

(52) U.S. Cl.
CPC ........... *H04W 16/14* (2013.01); *H04L 1/1812* (2013.01); *H04W 72/042* (2013.01); *H04W 72/0453* (2013.01); *H04W 72/1215* (2013.01); *H04W 74/0808* (2013.01); *H04W 88/12* (2013.01)

(58) Field of Classification Search
CPC . H04W 16/14; H04W 88/12; H04W 72/1215; H04W 72/042; H04W 72/0453; H04W 74/0808; H04L 1/1812
USPC .................. 455/454, 450, 451, 452.1, 452.2; 370/329, 330
See application file for complete search history.

(56) References Cited

U.S. PATENT DOCUMENTS 9,326,157 B1 4/2016 Bhorkar et al.
9,392,614 B2 7/2016 Bhorkar et al.
(Continued)

FOREIGN PATENT DOCUMENTS

CN 106465425 A 2/2017
KR 102016014867 A 12/2016
(Continued)

OTHER PUBLICATIONS

"U.S. Appl. No. 14/669,736, Non Final Office Action mailed Sep. 1, 2015", 11 pgs.
(Continued)

*Primary Examiner* — Khai M Nguyen

(57) ABSTRACT

Disclosed in some examples are systems, machine-readable media, methods, and cellular wireless devices which implement a Listen-Before-Talk (LBT) access scheme for a device operating according to a cellular wireless protocol in an unlicensed channel. A cellular wireless device may utilize the cellular wireless protocol in the unlicensed channel after the LBT access scheme has determined that a channel (a defined range of frequencies) in the unlicensed channel is idle for a particular period of time.

20 Claims, 12 Drawing Sheets

Related U.S. Application Data

(60) Provisional application No. 62/076,083, filed on Nov. 6, 2014.

(51) Int. Cl.
*H04W 72/04* (2009.01)
*H04W 88/12* (2009.01)

(56) References Cited

U.S. PATENT DOCUMENTS

| | | | |
|---|---|---|---|
| 2006/0223448 A1* | 10/2006 | Kruys | H04W 16/14 455/69 |
| 2007/0026868 A1 | 2/2007 | Schuktz et al. | |
| 2012/0077510 A1 | 3/2012 | Chen et al. | |
| 2013/0156019 A1 | 6/2013 | Chen | |
| 2013/0203458 A1 | 8/2013 | Charbit et al. | |
| 2013/0294356 A1 | 11/2013 | Bala et al. | |
| 2013/0337821 A1 | 12/2013 | Clegg | |
| 2014/0036818 A1 | 2/2014 | Koskela et al. | |
| 2014/0036889 A1 | 2/2014 | Kim et al. | |
| 2014/0112289 A1 | 4/2014 | Kim et al. | |
| 2014/0342745 A1 | 11/2014 | Bhushan et al. | |
| 2015/0085683 A1 | 3/2015 | Sadek et al. | |
| 2015/0131516 A1* | 5/2015 | Zhang | H04L 5/0007 370/312 |
| 2015/0163681 A1 | 6/2015 | Sadek | |
| 2015/0181453 A1 | 6/2015 | Chen et al. | |
| 2015/0201429 A1 | 7/2015 | Chen et al. | |
| 2015/0223244 A1 | 8/2015 | Tabet et al. | |
| 2015/0237548 A1 | 8/2015 | Luo et al. | |
| 2015/0382374 A1 | 12/2015 | Bhorkar et al. | |
| 2016/0007368 A1* | 1/2016 | Moon | H04W 56/00 370/329 |
| 2016/0135055 A1 | 5/2016 | Bhorkar et al. | |
| 2016/0255648 A1* | 9/2016 | Frenne | H04L 5/0048 |
| 2016/0295588 A1 | 10/2016 | Bhorkar et al. | |

FOREIGN PATENT DOCUMENTS

| | | |
|---|---|---|
| WO | WO-2012078565 A1 | 6/2012 |
| WO | WO-2013086659 A1 | 6/2013 |
| WO | WO-2016003674 A1 | 1/2016 |
| WO | WO-2016073616 A1 | 5/2016 |

OTHER PUBLICATIONS

"U.S. Appl. No. 14/669,736, Notice of Allowance mailed Feb. 26, 2016", 7 pgs.
"U.S. Appl. No. 14/669,736, Response filed Jan. 4, 2016 to Non Final Office Action mailed Sep. 1, 2015", 10 pgs.
"U.S. Appl. No. 14/711,278, Notice of Allowance mailed Dec. 18, 2015", 9 pgs.
"International Application Serial No. PCT/US2015/036674, International Search Report mailed Sep. 30, 2015", 3 pgs.
"International Application Serial No. PCT/US2015/036674, Written Opinion mailed Sep. 30, 2015", 9 pgs.
"International Application Serial No. PCT/US2015/059051, International Search Report mailed Feb. 15, 2016", 3 pgs.
"International Application Serial No. PCT/US2015/059051, Written Opinion mailed Feb. 15, 2016", 4 pgs.
"U.S. Appl. No. 14/669,736, corrected Notice of Allowance mailed Jun. 13, 2016", 4 pgs.
"Broadband Radio Access Networks (BRAN); 5 GHz high performance RLAN; Harmonized EN covering the essential requirements of article 3.2 of the R&TTE Directive", ETSI EN 301 893 V1.7.2, (Jul. 2014), 95 pgs.
"U.S. Appl. No. 15/185,890, Notice of Allowance mailed Mar. 29, 2017", 8 pgs.
"U.S. Appl. No. 15/185,890, Response filed Mar. 7, 2017 to Non Final Office Action mailed Oct. 7, 2016", 10 pgs.
"International Application Serial No. PCT/US2015/036674, International Preliminary Report on Patentability mailed Jan. 12, 2017", 11 pgs.
"U.S. Appl. No. 15/185,890, Non Final Office Action mailed Oct. 7, 2016", 16 pgs.
"International Application Serial No. PCT/US2015/059051, International Preliminary Report on Patentability dated May 18, 2017", 7 pgs.

* cited by examiner

SUBFRAME ALIGNED LISTEN-BEFORE-TALK FOR CELLULAR IN UNLICENSED BAND

PRIORITY CLAIM

This patent application is a continuation of U.S. application Ser. No. 14/711,278, filed May 13, 2015, issued as U.S. Pat. No. 9,326,157, which claims the benefit of priority under 35 U.S.C. Section 119 to U.S. Provisional Patent Application Ser. No. 62/076,083, filed on Nov. 6, 2014, all of which are hereby incorporated by reference herein in their entirety.

TECHNICAL FIELD

Embodiments pertain to cellular wireless technologies. Some embodiments relate to cellular wireless technologies operating in unlicensed communication bands.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, All Rights Reserved.

BACKGROUND

Cellular wireless technologies typically operate in a licensed frequency spectrum. A licensed frequency spectrum is a range of frequencies that are assigned to a particular entity (e.g., a particular wireless carrier) for use. As the available licensed frequency spectrums are limited and as demand rises for cellular wireless services, the amount of free spectrum available for use is limited.

In contrast to licensed frequency spectrums, there are various unlicensed frequency spectrums which allow for use of certain frequencies without an entity obtaining legal approval. These frequencies are shared amongst devices which wish to use them, and devices that use these spectrums have protocols to allow them to share the spectrum with other devices. Often these unlicensed spectrums are not licensed primarily for cellular wireless uses and often these spectrums are subject to contention or utilization by other devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
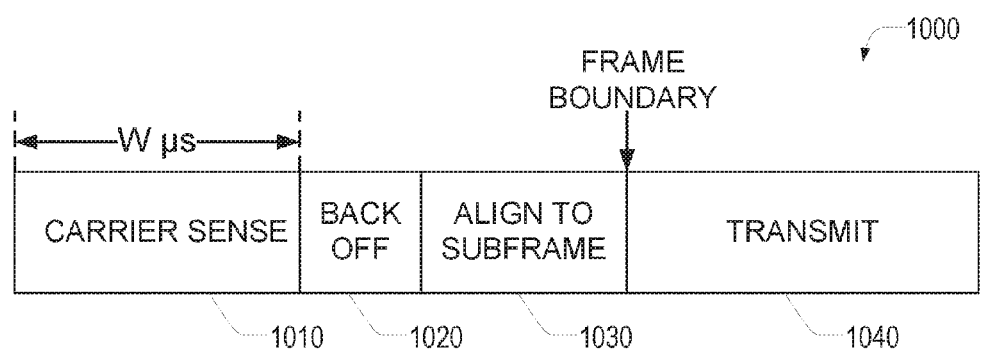
FIG. 1 is a timeline of a synchronous Listen-Before-Talk (LBT) method according to some examples of the present disclosure.

As demand for licensed spectrum for cellular wireless protocols such as Long Term Evolution (LTE) increases, designers of LTE systems have begun to explore the use of these licensed protocols in unlicensed frequencies. Usage of cellular and other licensed protocols in unlicensed frequencies presents certain challenges. Unlicensed frequencies may include the industrial, scientific, and medical (ISM) band, for example, 2.4 GHz, 5 GHz, and the like. The unlicensed frequencies may be determined by one or more governmental entities, such as the U.S. Federal Communications Commission (FCC).

For example, cellular wireless devices (e.g., a base station or a mobile device such as a smart phone) utilize licensed channels which ensure that these devices have exclusive use of the particular wireless channel. A "channel" is a band of (usually but not always contiguous) frequencies used for wireless communications. As a result, a design assumption of these cellular protocols is that they have exclusive access to the frequencies on which they operate. They are generally concerned with coordinating amongst other devices participating in the same network. For example, in LTE systems, a base station (an eNodeB) typically coordinates transmission and reception from one or more User Equipments (UEs) that are associated with the eNodeB. The eNodeB generally does not consider other users in other networks when planning transmission and reception of data. If a cellular wireless network began transmitting in the unlicensed channel without modification, the cellular wireless devices would transmit and receive continuously. This would prevent other devices from utilizing the channel.

In contrast, devices operating in unlicensed channels consider not only devices operating in a single network (e.g., controlled by a single operator), but devices operating in many different networks and devices operating using other protocols. For example, devices operating according to wireless protocols such as an 802.11 standard defined by the Institute for Electrical and Electronics Engineers (IEEE) (Wi-Fi) consider not only devices in their own network (i.e., a Basic Service Set—BSS), but devices in other BSSs and indeed devices running other protocols before determining whether they can use the wireless medium.

What are therefore needed are methods for adapting a cellular wireless protocol to operate in an unlicensed channel in an efficient manner. Disclosed in some examples are systems, machine-readable media, methods, and cellular wireless devices which implement modifications for operating according to a cellular wireless protocol in an unlicensed band. Such modifications include implementing a Listen-Before-Talk (LBT) access scheme that the cellular wireless device employs in the unlicensed channels, optimizing scheduling, and optimizing channel sensing.

A "cellular wireless device," as used herein, is any device that is operating according to a cellular wireless protocol. A "cellular wireless protocol" is a wireless protocol defining a cellular wireless network which is distributed over land areas called cells, with each cell served by at least one fixed-location transceiver, known as a cell site or base station. These cell sites are interconnected to provide wireless services over a wide geographic area. Example cellular wireless protocols that may be adapted for transmission in the unlicensed channels include cellular wireless protocols according to one of an LTE family of standards promulgated by the Third Generation Partnership Project (3GPP) (including an LTE Advanced (LTE-A) Family of Standards), a Universal Mobile Telecommunications System (UMTS) family of standards promulgated by 3GPP, a Global System for Mobile Communications (GSM) family of standards, and the like. A cellular wireless device may be a base station such as a NodeB or an eNodeB, or may be a mobile device such as a UE.

In some examples, a cellular wireless device may use the licensed band for controlling the transmissions on the unlicensed band (for example, obtaining Channel State Information (CSI) feedback, scheduling on a Physical Downlink Control Channel (PDCCH) and the like).

Example transmissions of the cellular wireless devices in the unlicensed channel include transmissions to support one or more of Layer 1, Layer 2, Layer 3, and other layers of these cellular protocols (for example, the Physical (PHY) layer, the Media Access Control (MAC) layer, the Radio Link Control (RLC) layer, the Packet Data Convergence Protocol (PDCP), and the Radio Resource Control (RRC) layers). Channels transmitted in the unlicensed frequency may include any uplink data channels, uplink control channels, downlink data channels, and downlink control channels. Examples include one or more of a Physical Downlink Shared Channel (PDSCH), a Physical Uplink Shared Channel (PUSCH), a PDCCH, and a Physical Uplink Control Channel (PUCCH).

In some examples, a cellular wireless device such as a cellular base station (e.g., eNodeB) may provide a cell with uplink and downlink capabilities in the licensed spectrum and also provide a supplemental downlink (SDL) channel in an unlicensed spectrum. The SDL channel may carry one or more LTE channels, such as a PDSCH. The LBT techniques may be applied to the SDL channel to ensure that the unlicensed channels are idle and free of interference. In other examples, for uplink channels on the unlicensed spectrum, the UE may be the cellular wireless device which implements the LBT mechanisms. In some examples, the SDL may be scheduled on a PDCCH on the primary (licensed) frequencies. For example, the UE may be scheduled on the PDCCH of a licensed frequency for receiving data on the SDL PDSCH on the unlicensed frequency (i.e., using cross carrier scheduling).

Aspects of the cellular wireless protocols may be modified in one or more ways such as disclosed herein in order to operate within the unlicensed frequency spectrum. For example, an LBT access scheme may be implemented in the cellular wireless protocol by the cellular wireless device.

LBT, Channel Sensing, and Backoff Designs

In some examples, the cellular wireless device implementing an LBT access mode for the unlicensed band may listen to the channel for a channel listen time (a predetermined period of time). If the channel is idle for the channel listen time, the cellular wireless device may deem that the channel is available for transmission.

FIG. 1 shows a timeline 1000 of a cellular wireless device operating synchronously in an unlicensed channel using an LBT mechanism. At stage 1010, a transceiver of the cellular wireless device conducts carrier sensing (CS) for a channel in the unlicensed band for a period of W µs and determines the average power received. If the received power is less than a threshold T dBm, the channel is considered idle. Otherwise, if the received power is greater than the threshold, the channel is considered busy. At stage 1020, if the channel is determined to be idle, the transceiver enters a backoff phase. In the backoff phase, the transceiver chooses a backoff time period. The time period may be chosen randomly from a selection of legal values. In some examples this time period may be a multiple of LTE symbols. During this backoff period, the transceiver senses the channel. If the channel is busy during this period, the transceiver goes back to the carrier sense phase at stage 1010. If the channel is idle, the transceiver enters stage 1030. The backoff period of stage 1020 may be considered a random duration extension of the fixed duration carrier sense phase of stage 1010. The backoff period prevents numerous wireless devices with the same value for W all trying to access the medium at the same time.

During stage 1030, the transceiver may send a reservation message or signal to reserve the channel until the next subframe boundary of the cellular network or until the next subframe boundary plus the amount of time needed to transmit the next subframe in order to align to the subframe. Example reservation signals may be a Wi-Fi Request to Send (RTS) or Clear to Send (CTS). Once the subframe boundary has passed, the transceiver may transmit at stage 1040.

For downlink operation on the unlicensed channel, for an LTE network, the eNodeB may implement the LBT decision making, while on the uplink, the eNodeB may implement the LBT mechanism, but convey information to the UE to enable the UE to transmit during the stage 1040.

Within the context of a cellular wireless network such as LTE, what is needed is to define how often to sample the channel when carrier sensing or backoff sensing. Sampling the channel too often leads to increased costs of manufacturing and increased workloads on the transceiver. Sampling the channel too infrequently can lead to erroneously reporting the channel as idle and causing collisions.

Within an LTE subframe there are fourteen symbols. In some examples, the channel may be sampled once per symbol. However, this level of sampling granularity may be too infrequent as each frame is 1 millisecond, and $1/14^{th}$ of 1 millisecond is approximately 70 microseconds.

Figure 2A:
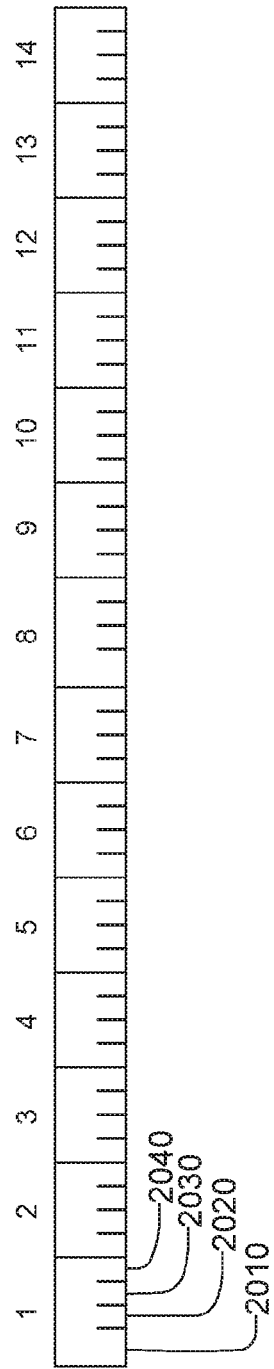
FIG. 2A shows a slit diagram of symbol aligned slits according to some examples of the present disclosure.

In some examples, a smaller granularity for a sample maybe utilized. For example, each symbol may be subdivided into two or more "slits." A slit, as used herein, may be defined as the basic unit of granularity for sensing a channel and may be defined with reference to timing information of the cellular wireless protocol. For example, each symbol may be divided into four slits. In these examples, the slits do not cross a symbol boundary. This presents a dilemma because in an LTE subframe the first and eighth symbols are slightly larger, having 2208 samples compared to 2192 samples as in the other symbols. In these examples, the slits of the first and eighth symbols may be 552 samples and the remaining slits may be 548 samples. In other examples, for the first and eighth symbols, the extra symbols (16) may be divided up in other ways. For example, three of the slits of these symbols may be 548 samples, and the remaining slit may be 564 samples. FIG. 2A shows one example slit diagram 2000 of symbol aligned slits. Slit 2010, as shown, is slightly larger than slits 2020-2040 of symbol one and the rest of the slits of symbols 2-14, with the exception of one or more slits in symbol eight (as symbol 8 also contains 2208 samples).

Figure 2B:
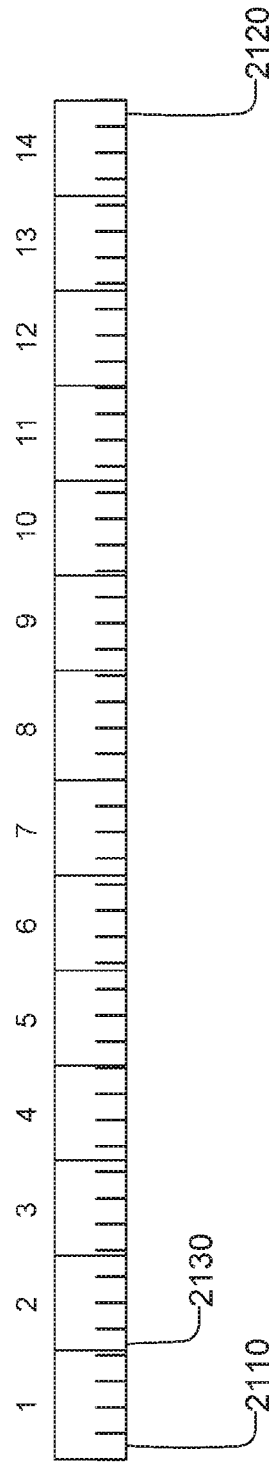
FIG. 2B shows a slit diagram of evenly divided slits according to some examples of the present disclosure.

In other examples, rather than divide the symbols to create the slits, the subframe itself may be sub-divided into equal, fixed-size slits. In this example, a slit may include portions of two consecutive symbols. That is, the slit may cross a symbol boundary. FIG. 2B shows one example slit diagram 2100 of evenly divided slits. In some examples, the first slit 2110 starts on the beginning of the subframe and the last slit 2120 ends on the subframe ending boundary. As can be appreciated from the figure, slits may cross symbol boundaries, such as slit 2130, which cross symbols 1 and 2. In some examples, if N is the number of samples in one slit, because it may be desirable that the slit boundary coincides with a subframe boundary (which has 30720 samples), N may be chosen such that N is a factor of 307200. Thus, the number of slits may be described by 30720/N. As each subframe is 1 millisecond (ms) in duration ($10^3$ µs), and because there are 30720 samples in a subframe, there are 30.72 samples in 1 microsecond. As the LTE specification defines the minimum sensing period for the unlicensed channel as 20 microseconds (µs), multiplying by 20, we get 614.4 samples in 20 microseconds as the minimum number of samples to sense.

Because the sample is the smallest granularity in LTE, having 0.4 samples may be rounded up (as 614 would produce a sensing time of less than 2 microseconds) to at least 615. However, it may be desirable that N be a factor of 30720 so that all the slits fit into the same subframe. One option may be 48 slits in a subframe, which works out to be 640 samples for each slit. Having 640 samples/slit means each slit is approximately 20.83 microseconds long which is slightly above the minimum of 20 microseconds. In other examples, more slits per subframe may be utilized; however, the cellular wireless device may need to sense for more than a single slit in order to meet the minimum specified in the LTE specification.

To implement the sensing and backoff, disclosed herein are three example designs. These options are all suitable for co-existence between a cellular wireless protocol such as LTE and a wireless protocol that operates on the unlicensed channel such as Wi-Fi.

Figure 3:
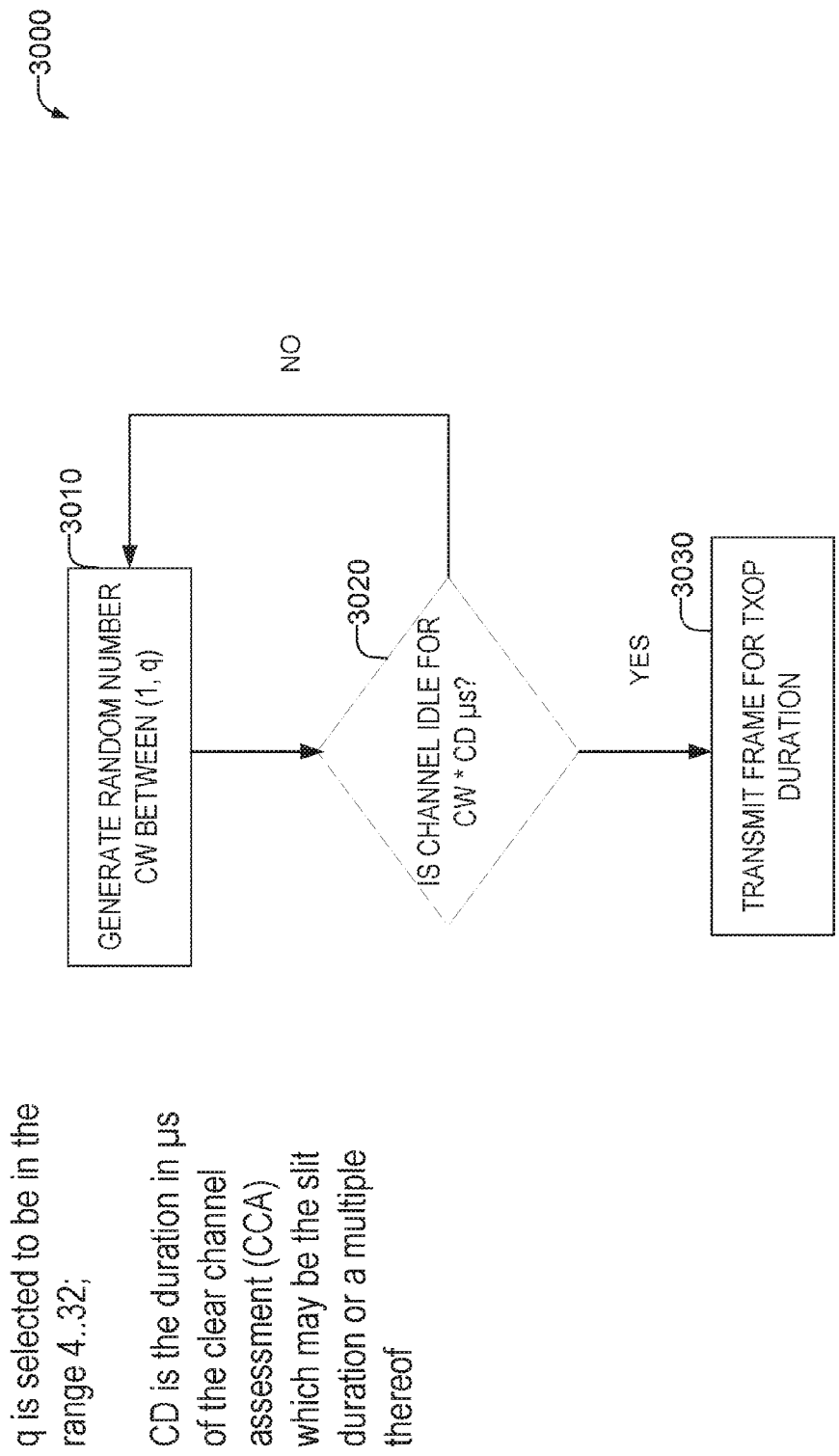
FIG. 3 shows a flowchart of a method of a first option for LBT sensing and backoff according to some examples of the present disclosure.

FIG. 3 shows a flowchart of a method 3000 of a first option for LBT sensing and backoff according to some examples of the present disclosure. In the first option, a Contention Window (CW) is employed to determine when the channel is clear. The transceiver of the cellular wireless device may select a random number between 1 and q at operation 3010. In some examples, q is defined as a predetermined value between 4 and 32 that, in some cases, may be determined by the manufacturer of the cellular wireless device. In other examples, q may be dynamically changed. At operation 3020, the transceiver of the cellular wireless device may sense the channel for a period of time that is (or is approximately) the CW multiplied by the Clear Channel Assessment (CCA) Duration (CD) (CD is in microseconds). CD may be defined as one or more whole slits. To determine if the channel is idle, in some examples, the received power of the channel during a particular CD may be compared to a predetermined threshold (e.g., a threshold of −62 dBm). If the power is less than the threshold, than the channel may be deemed idle during that slit. If the power is above the threshold, then the channel may be deemed busy during that slit. In some examples, if a single slit is deemed busy, then the whole period may be deemed busy. In other examples, if more than a predetermined amount of slits are deemed busy, then the whole CW*CD period may be deemed busy. In still other examples, the received power may be sampled at each slit and then averaged over the entire CW*CD period and the average power over that period may be compared with a threshold. If the average power is above the threshold, the channel may be deemed busy. If the average power is below the threshold, the channel may be deemed idle.

If the channel is deemed idle, the cellular wireless device may proceed with transmitting the SDL at operation 3030. If the channel is deemed busy, the cellular wireless device may return to operation 3010 and start over.

In some examples, this method of detecting that the medium is idle differs from that of Wi-Fi carrier sensing. In Wi-Fi carrier sensing, a Wi-Fi device uses both an energy detection mechanism and a signal detection mechanism. If the Wi-Fi device detects a Wi-Fi signal using the signal detection mechanism, the Wi-Fi device assumes that the channel is occupied. In some examples, the LBT method disclosed herein uses only the energy detection mechanism and not the Wi-Fi signal detection mechanisms.

Figure 4:
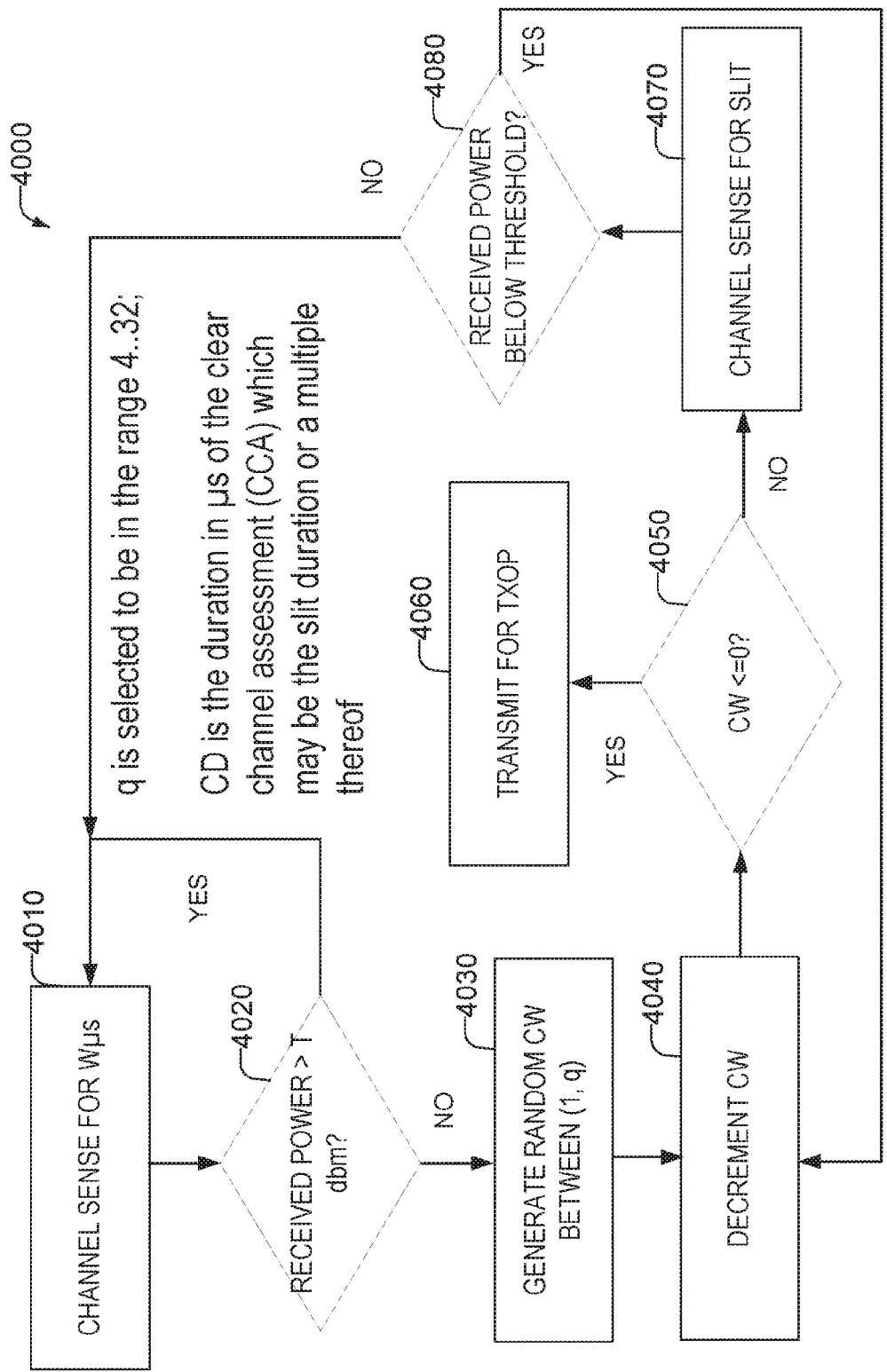
FIG. 4 shows a flowchart of a method of a second option for LBT sensing and backoff according to some examples of the present disclosure.

FIG. 4 shows a flowchart of a method 4000 of a second option for sensing and backoff LBT implementation. At operation 4010, the transceiver senses the channel for W µs. W may be a time period that is equal to one or more slits. At operation 4020, a comparison is made and if the received power is above a threshold T for W time period, then the transceiver returns to operation 4010. If the received power is below the threshold T for W time period, then the transceiver goes to operation 4030. If W encompasses more than a single slit, the power comparison may be an average power across all slits, or the comparison at operation 4020 may be per slit. In the per slit case, if more than a predetermined number (e.g., one or more) of slits fail the comparison (e.g., the power level is greater than the threshold) then the comparison at operation 4020 fails and flow proceeds back to operation 4010.

At operation 4030 the transceiver may generate a random number CW between 1 and q, where q (as previously noted) is a number between 4 and 32. At operation 4040 CW may be decremented (e.g., CW=CW−1). At operation 4050 a comparison is made to determine if CW is less than or equal to zero. If CW is less than or equal to zero, then the channel is clear and the transceiver may transmit at operation 4060. If CW>0, then at operation 4070, the transceiver may sense the channel for a slit period. At operation 4080 a comparison is made and if the observed power level is less than a threshold, it is determined that the channel is idle for that slit and operations proceed to 4040 where the CW is decremented again. If the channel is not idle, operation reverts to 4010.

Figure 5:
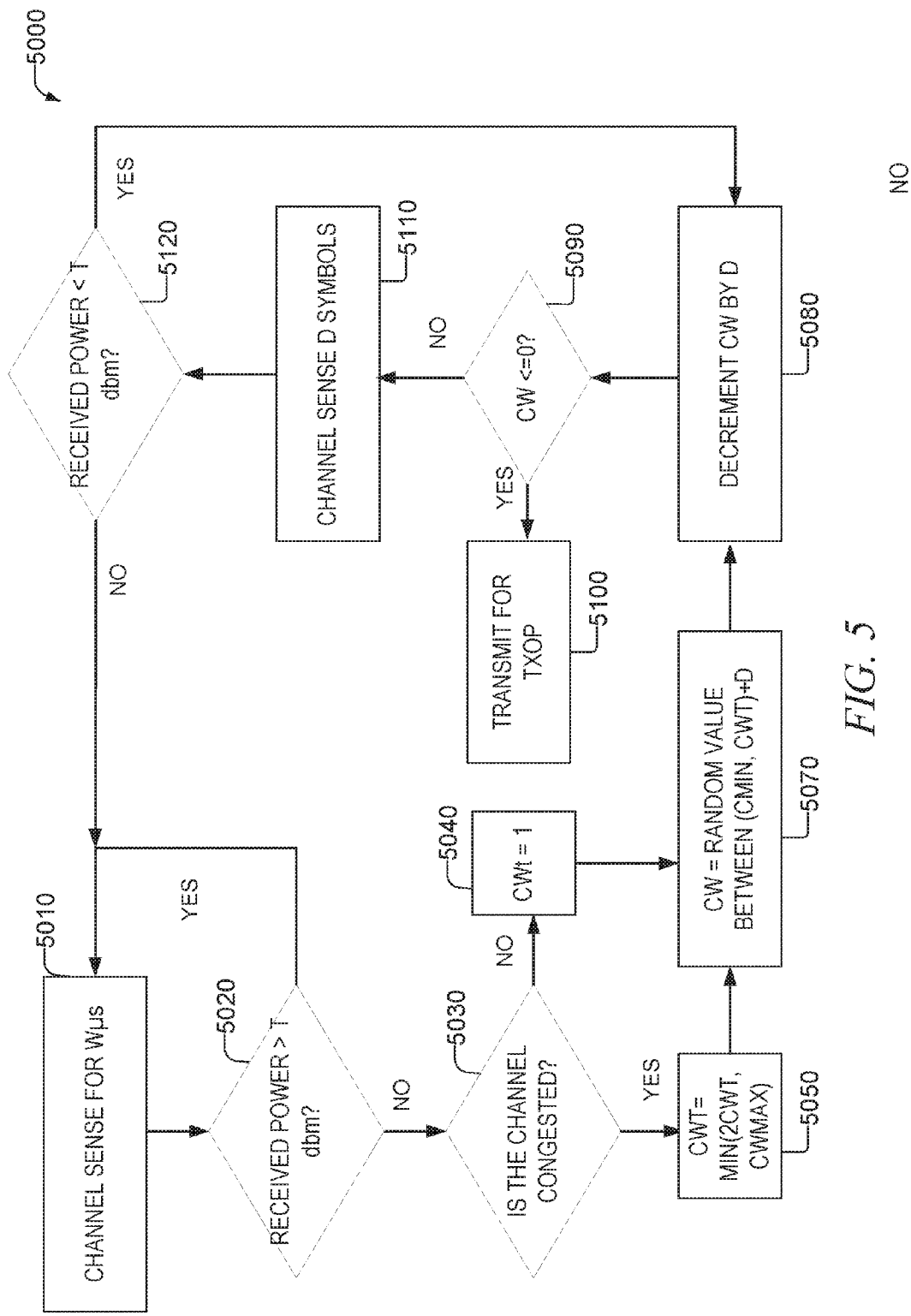
FIG. 5 shows a flowchart of a method of a third option for LBT sensing and backoff according to some examples of the present disclosure.

FIG. 5 shows a flowchart of a method of a third option for LBT sensing and backoff according to some examples of the present disclosure. At operation 5010, the transceiver senses the channel for W μs. W may be a time period that is equal to one or more slits. At operation 5020, a comparison is made and if the received power is above a threshold T for W time period, then the transceiver returns to operation 5010. If the received power is below the threshold T for W time period, then the transceiver goes to operation 5030. If W encompasses more than a single slit, the power comparison may be an average power across all slits, or the comparison at operation 5020 may be per slit. In the per slit case, if more than a predetermined number (e.g., one or more) of slits fail the comparison (e.g., the power level is greater than the threshold), then the comparison at operation 5020 fails and flow proceeds back to operation 5010.

At operation 5030 the transceiver may determine if the channel is congested. For example, if the transceiver had to sense the channel for W μs at operation 5010 more than a predetermined number of times the transceiver may determine that the channel is congested. In other examples, the transceiver may determine that the channel is congested based upon errors in previous transmissions—for example, utilizing a transport block error (TBE) level. If the TBE is above a predetermined threshold, then channel may be determined to be congested.

At operation 5050, if the channel is congested, a parameter, CWT, may be set to the maximum of: double the last CWT and the maximum contention window (CWMAX). CWT, CWMIN, and CWMAX may be predefined; for example, CWT may be initially 1, CWMIN may be 1, and CWMAX may be 1024. At operation 5040, if the channel is not congested, CWT may be set to 1.

At operation 5070 the transceiver may generate a random number CW by adding a value D to a random number chosen between CMIN and CWT. D may be equal to the time in number of slits it takes to transmit one or more LTE symbols. At operation 5080, CW may be decremented by D (e.g., CW=CW-D). At operation 5090 a comparison is made to determine if CW is less than or equal to zero. If CW is less than or equal to zero, then the channel is clear and the transceiver may transmit at operation 5100. If CW>0, then at operation 5110, the transceiver may sense the channel for D time period (which may be one or more slits). If at operation 5120 it is determined that the channel is idle, operations proceeds to operation 5080 where the CW is decremented again. If the channel is not idle, operation reverts to operation 5010. The channel may be determined idle as described in options 1 and 2 (i.e. the observed power in each slit may be below a threshold, an average power observed in each slit may be below a threshold, or a predetermined number of slits in the CD period may be below a threshold).

Scheduling Optimizations

In some examples, the SDL may be implemented using a control channel on the licensed channel (i.e., the primary channel). For example, in LTE, the SDL may be implemented utilizing the PDCCH on the licensed channel. The PDCCH is typically carried on the first three symbols of the current subframe and schedules the current subframe. If the backoff period completes before the start of the next subframe the eNodeB may reserve the channel by sending a channel reservation message on the unlicensed channel (e.g., a Request-to-Send—RTS, or Clear-to-Send—CTS message) and schedule the SDL using the PDCCH of the next subframe. If the backoff period ends during the PDCCH transmission of the next subframe, it may be possible to schedule the SDL depending on the other scheduling and on the bandwidth of the PDCCH. If the backoff period ends before the SDL can be scheduled on the PDCCH of the licensed channel, the SDL transmission opportunity may be wasted.

In some examples, the eNodeB may schedule the SDL even if the backoff period will not end until after the start of the subframe. For example, the eNodeB may predict that the backoff period may complete successfully (the channel remains idle the entire period) and may schedule the SDL for the remaining part of the subframe after the backoff procedure is scheduled for completion. For example, if the backoff procedure is to be completed half-way through the subframe, the eNodeB may schedule half of the subframe in anticipation that the backoff process may complete successfully.

In some examples, predicting the backoff period may complete successfully may include assuming that the backoff period completes successfully. In some examples, past history of the channel may be used to predict the backoff period is to complete successfully. In these examples, if the eNodeB successfully completed the backoff process above a threshold percentage of time in the past on this channel, the eNodeB may predict that the backoff process this time may be successful. Other algorithms may include factoring in one or more of: time of the access, history of the channel, past error rates, and the like. Example algorithms may utilize if-then statements that compare these factors to predetermined thresholds.

In some examples, the backoff overlap may be limited to the first three symbols of the current subframe (where the PDCCH is normally transmitted). Thus if the backoff will complete in the first three symbols of the current subframe, the eNodeB may schedule the SDL PDSCH. Otherwise, if the backoff is not scheduled to be complete within the first three symbols of the current subframe, the eNodeB will not schedule the SDL PDSCH in the current subframe.

In cases in which the eNodeB anticipatorily schedules the SDL PDSCH, the UE receives the data on the SDL if the backoff period successfully completes and the eNodeB is able to transmit the SDL. If the channel becomes busy before the backoff period ends and the eNodeB does not get access to the unlicensed channel, the UE may not know this and will receive data that is not valid (e.g., noise). The UE would not be able to successfully decode the PDSCH on the SDL. In an idealized situation, the UE would simply discard the PDSCH on the SDL for this subframe. The UE, thinking it missed data that was transmitted to it, will utilize Hybrid Automatic Repeat Request (HARQ) functionality to request re-transmission of the missed data. In this case, the eNodeB may ignore any HARQ requests for this data and may indicate to the UE to remove this data from its HARQ buffers. For example, a new Downlink Control Information (DCI) format may be defined to carry an indication that the SDL was not actually sent over the unlicensed channel. Alternatively, in some examples, a new physical signal or channel can be defined to carry the new indication message.

Figure 6:
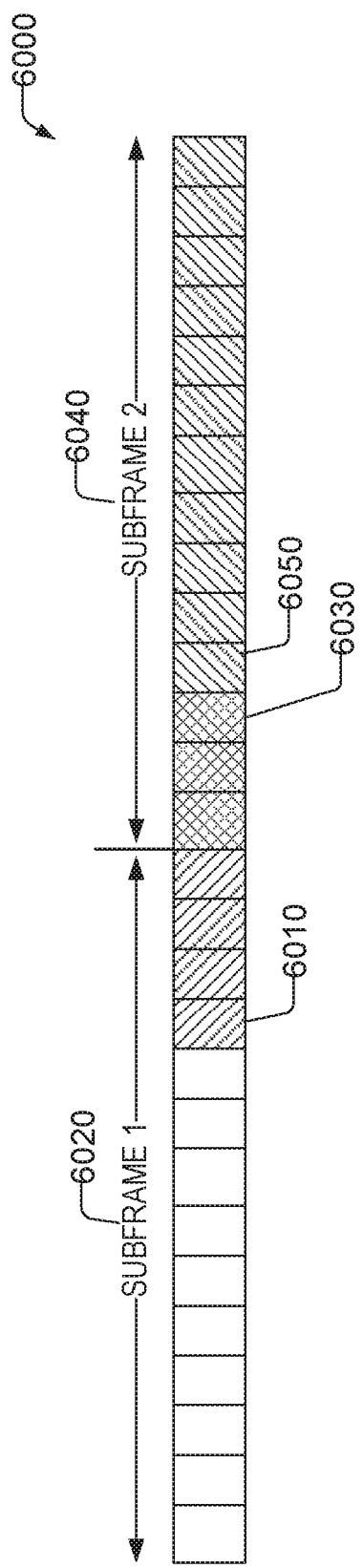
FIG. 6 shows a diagram of anticipatory scheduling of the SDL according to some examples of the present disclosure.

Turning now to FIG. 6, a diagram 6000 of anticipatory scheduling of the SDL is shown. LBT and backoff starts at symbol 6010 of subframe 6020. If the backoff is predicted to be complete by symbol 6030 (the third symbol of subframe 2 6040), then the eNodeB may schedule the SDL on subframe 2 6040. For example, the eNodeB may schedule a UE to receive data on symbol 6050.

Figure 7:
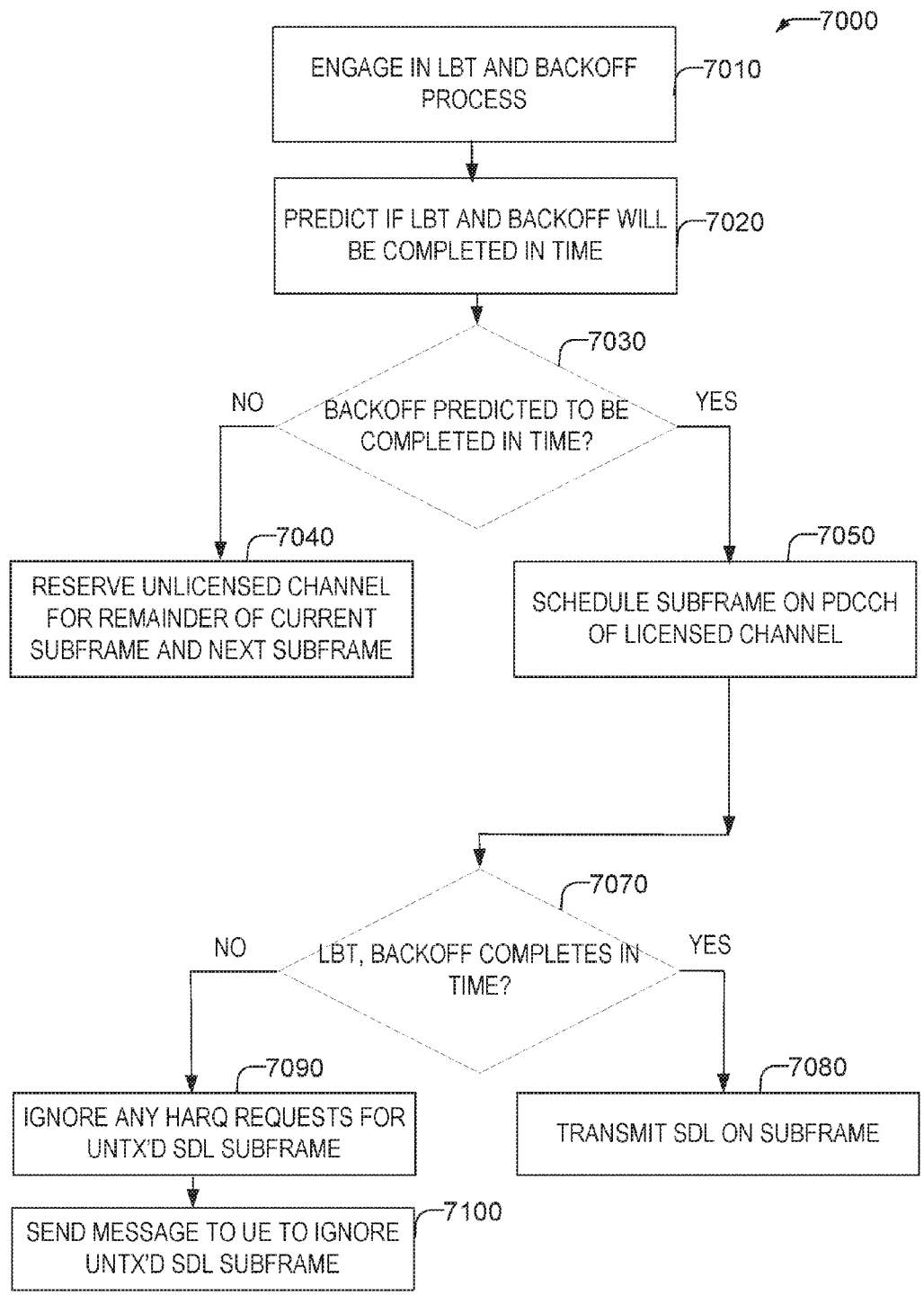
FIG. 7 shows a flowchart of a method of anticipatory scheduling of the SDL according to some examples of the present disclosure.

Turning now to FIG. 7 a flowchart of a method 7000 of anticipatory scheduling of the SDL is shown. At operation 7010 the cellular wireless device (e.g., the eNodeB) may engage in the LBT and Backoff processes (e.g., FIGS. 3-5).

At operation 7020 the cellular wireless device predicts if the LBT and backoff process will complete in time. In some examples, this is simply assuming that the backoff process will not return a busy channel and determining if there is enough time to schedule any part of the SDL. For example, if the backoff process were to complete within the first three symbols of a particular subframe, that subframe may be scheduled. In other examples, other criteria, such as past channel usage history or past LBT and backoff success rates, may be used.

If at operation 7030 the backoff is not predicted to be completed on time, then flow proceeds to operation 7040. At operation 7040, the channel may be reserved once the backoff process is completed until a subframe can be scheduled and transmitted on the SDL. If the backoff process is scheduled to be completed on time, at operation 7050, the subframe may be scheduled on the PDCCH of the licensed channel when appropriate. At operation 7070, the cellular wireless device may determine if the LBT and backoff completed on time. If it did, at operation 7080, the cellular wireless device may transmit the SDL on the unlicensed channel as normal. It if did not, at operation 7090, the cellular wireless device may ignore any HARQ retransmission requests from any UEs scheduled on the SDL for the unsent SDL subframe. At operation 7100, the cellular wireless device may send a message to the UEs that were scheduled on the SDL to clear their HARQ buffers and terminate retransmission tries for this data.

Channel Sense Optimizations

In some examples, in order to send multiple subframes, the cellular wireless device may utilize one or more symbols in the current subframe in which data is not transmitted to perform sensing and backoff in order to meet the requirements to transmit another subframe. The symbols of the current subframe used to perform the sensing and backoff operations are "punctured." In some examples, the last K symbols of the current frame are punctured. In some examples K=2. In some examples, every subframe may be punctured by K symbols. In yet other examples, every L subframes may be punctured (e.g., every other subframe, or every 3 subframes, and the like). K may be static (that is, every Lth subframe, K symbols may be punctured), but in some examples K may change so that K in one subframe is different from K in another subframe.

The UEs associated with the eNodeB may be notified of the symbol puncturing in order to discard any received data during these symbols. Notifications to the UE may include exact locations of the punctured symbols. Example notifications may include a new DCI. The DCI may include a bit-map of B (up to 14) bits, indicating the positions of the punctured symbols in the subframe. In other examples, the DCI may be avoided if the transceiver on the cellular wireless device uses significantly higher redundancy MCS (with lower code rate) transmissions to counteract the puncturing.

Figure 8:
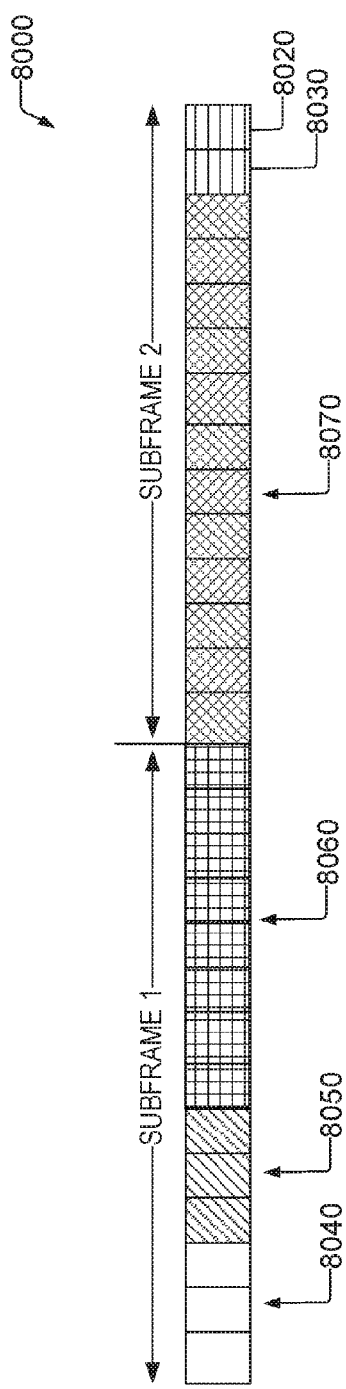
FIG. 8 shows a diagram of puncturing symbols of a subframe according to some examples of the present disclosure.

Turning now to FIG. 8, a diagram 8000 of puncturing the last two symbols 8020 and 8030 of a subframe is shown. Three symbols 8040 of subframe 1 are taken up by Wi-Fi traffic or are idle. Three symbols 8050 are sensing and backoff, and eight symbols 8060 are reserved by the cellular wireless device prior to the start of subframe 2. Once subframe 2 is started, the cellular wireless device may transmit the SDL PDSCH 8070. Symbols 8030 and 8020 are punctured to start the sensing and backoff for the next subframe (not shown).

In some examples, the backoff implemented may be any one of the previously described methods. In some examples, the channel sense optimizations may be combined with the scheduling optimizations. In any case, all the various options for channel sense and backoff are compatible and may be used with either or both of the channel sense optimizations and scheduling optimizations.

Figure 9:
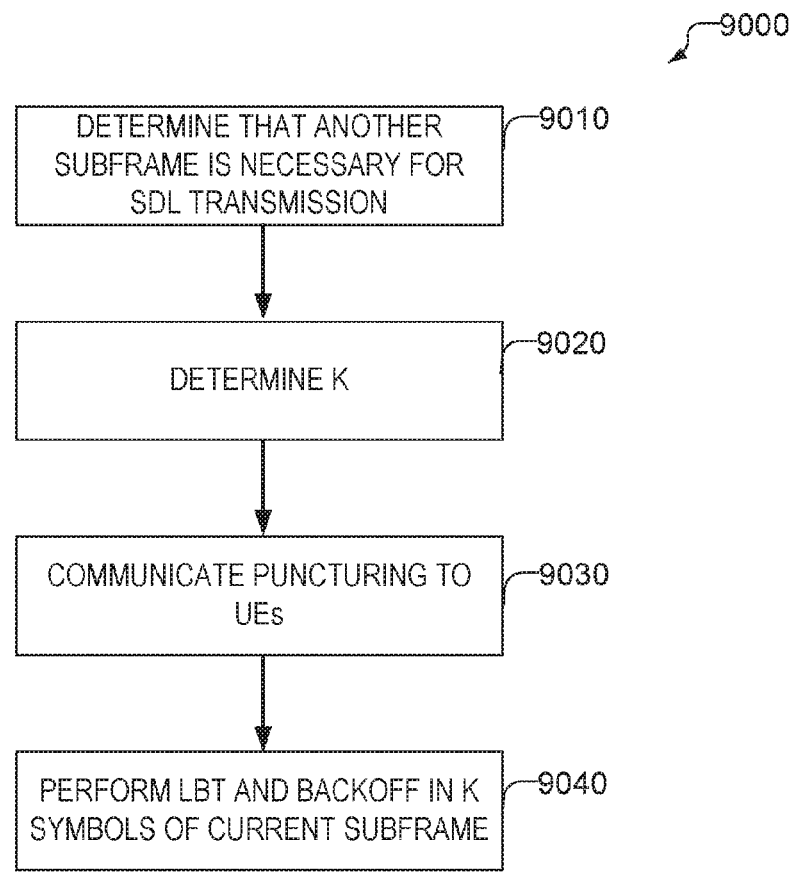
FIG. 9 shows a flowchart of a method of a cellular wireless device puncturing symbols according to some examples of the present disclosure.

Turning now to FIG. 9, a method 9000 of a cellular wireless device puncturing K symbols is shown according to some examples. At operation 9010, the cellular wireless device may determine that another subframe is desired for SDL transmission. For example, the eNodeB may have additional data for one or more UEs. At operation 9020, the eNodeB may determine K. K may be predetermined, or may be variable. At operation 9030, the puncturing parameters may be communicated to one or more UEs that are scheduled on the current subframe. Puncturing parameters may include the symbols that are to be punctured or one or more pieces of information that allows the UE to deduce the symbols that are to be punctured (e.g., K). At operation 9040, the cellular wireless device may perform LBT and Backoff in the punctured symbols of the current subframe.

Figure 10:
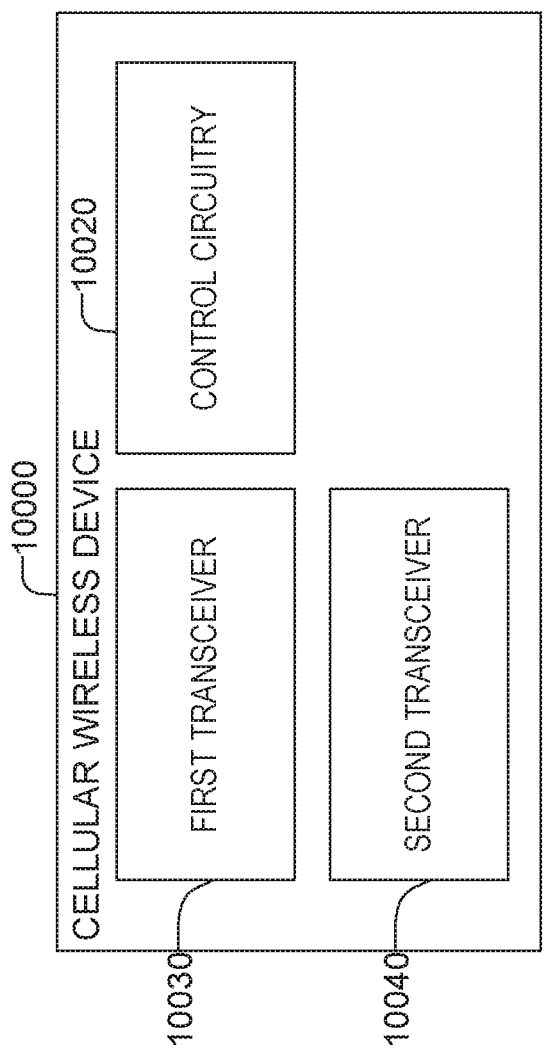
FIG. 10 shows a schematic of a cellular wireless device according to some examples of the present disclosure.

Turning now to FIG. 10, a schematic of a cellular wireless device 10000 is shown, according to some examples. The cellular wireless device 10000 may be any device that is capable of communicating using a licensed cellular protocol. The cellular wireless device 10000 may be a nodeB, an eNodeB, a UE, a Base Transceiver Station (BTS), a Wi-Fi access point, a cell phone, a smart phone, a desktop computer, a laptop computer, a medical device (e.g., a heart rate monitor, a blood pressure monitor, or the like), a wearable device (e.g., computing glasses, a smart watch), or the like.

The cellular wireless device 10000 may contain a first wireless transceiver 10030, a second wireless transceiver 10040, and control circuitry 10020 for controlling the first and second wireless transceivers. The first wireless transceiver 10030 may operate on an unlicensed channel, and in some examples, implement a wireless protocol that is not a cellular wireless protocol. In some examples, the first wireless transceiver 10030 may implement a wireless protocol that operates in the unlicensed channels, such as an IEEE 802.11 wireless protocol, a Bluetooth wireless protocol, a Bluetooth Low Energy (BLE) wireless protocol, a Zigbee wireless protocol, or the like. In some examples, the first wireless transceiver 10030 may determine whether the unlicensed channel is occupied with other traffic. In some examples, the first transceiver 10030 may detect the power level on the unlicensed channel and if the average power level is below a particular threshold for a predetermined period of time, then the control circuitry 10020 may determine that the channel is unoccupied using one or more of the methods of FIGS. 3-5.

Control circuitry 10020 may control the backoff process once the channel is deemed unoccupied. The control circuitry 10020 may, in cooperation with the first transceiver 10030, cause the operations of FIGS. 3-5 to be implemented, such as selecting a random contention window, decrementing the contention window, using the first transceiver 10030 to sense the channel for W μs, determining if the backoff period is over, or, if activity is detected on the channel during the backoff period, signaling the first transceiver 10030 to once again determine if the medium is free by detecting the power level on the unlicensed channel for a channel listen period of time. Once the control circuitry 10020 and first transceiver 10030 have determined that the channel is once again free, the control circuitry 10020 will start over and once again implement the backoff procedure.

Control circuitry 10020 may also implement the Scheduling and Channel Sense optimizations. For example, control circuitry 10020 may predict if the LBT and Backoff will be completed in time to schedule a subframe. If the LBT/backoff is not predicted to be completed in time, the control circuitry 10020 may instruct the first or second transceivers 10030, 10040 to transmit reservation messages once the LBT and backoff are completed for the next available subframe. If the LBT/back off is predicted to be complete in time to transmit the SDL PDSCH in the current subframe, then the control circuitry will schedule one or more UEs on the SDL PDSCH via the PDCCH transmitted by the second transceiver 10040. If the UEs were scheduled but the LBT/backoff procedure failed to successfully complete, the control circuitry may ignore any HARQ transmissions related to the subframe. The control circuitry may also instruct any receivers (e.g., UEs) via the second transceiver 10040 or first transceiver 10030 (e.g., over the licensed or unlicensed channels) to remove these items from their HARQ queues so they will no longer request retransmission.

Control circuitry 10020 may also implement one or more channel sense optimizations. Control circuitry 10020 may determine K and L, and communicate with any receivers (e.g., UEs) via the second transceiver 10040 or the first transceiver 10030 (e.g., over the licensed or unlicensed channels) about the puncturing parameters. Additionally the control circuitry 10020 may implement this puncturing via the first transceiver.

The second wireless transceiver 10040 may implement a cellular wireless protocol and may generally transmit over a licensed frequency. Example cellular wireless protocols may include a Long Term Evolution (LTE family of standards promulgated by the Third Generation Partnership Project (3GPP), Universal Mobile Telecommunications (UMTS) promulgated by 3GPP, an Institute for Electrical and Electronics Engineers (IEEE) 802.16 standard known as Worldwide Interoperability for Microwave Access (WiMAX), and the like. The second transceiver 10040 may provide for one or more protocol layers of the cellular wireless protocol to enable communications. For example, if the cellular wireless device 10000 is an eNodeB, the second transceiver 10040 provides the functionality to implement the eNodeB. If the cellular wireless device 10000 is a UE, the second transceiver 10040 provides the functionality to connect to the cellular network and transfer data across that network. The second transceiver 10040 may utilize the licensed bandwidth, but may also have circuitry to send and receive data across the unlicensed bandwidth.

Control circuitry 10020 may control the first transceiver 10030, as well as second transceiver 10040. When the control circuitry 10020 determines that the unlicensed channels are to be used for the cellular wireless protocol, the control circuitry 10020 may determine when the channel is free using first transceiver 10030, and in some examples, reserve the channel using a channel reservation message via first transceiver 10030. Once the channel is free, the control circuitry 10020 may instruct either the first or second transceivers 10030 and 10040 to transmit on the unlicensed band using the cellular wireless protocol.

In some examples, the cellular wireless device 10000 may send a reservation message on the unlicensed channels. In some examples, the reservation message has a duration field which may be set to the duration of cellular data transfer (e.g., a subframe). In some examples, the cellular wireless device 10000 may not begin transmitting until a subframe boundary. In these examples, if a reservation message is sent, the reservation message may have a duration equal to the duration of cellular data transfer plus the amount of time until the next subframe boundary.

Figure 11:
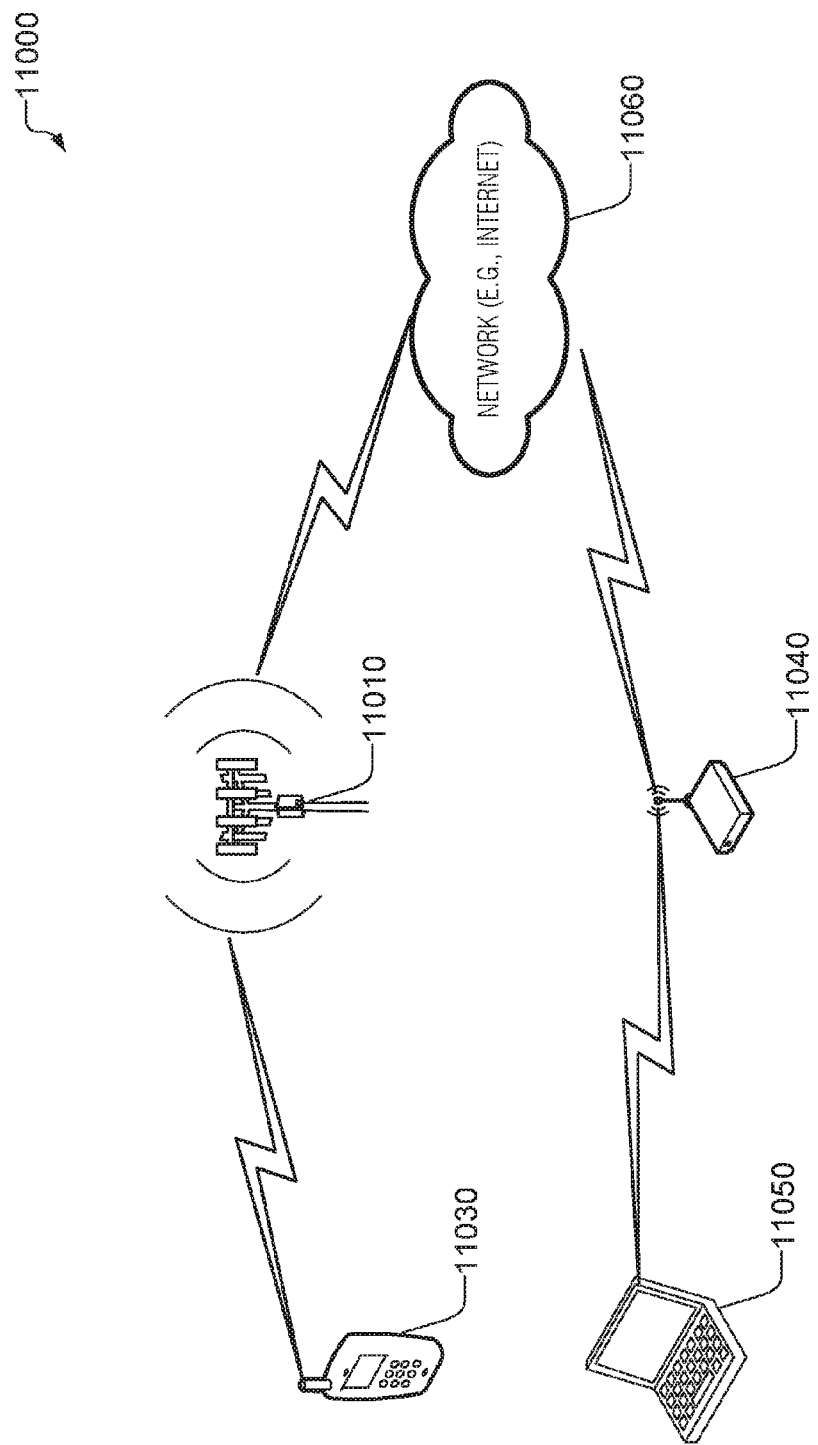
FIG. 11 shows a schematic of a wireless environment according to some examples of the present disclosure.

FIG. 11 shows a schematic of an example wireless environment 11000 according to some examples of the present disclosure. Cellular wireless device in the form of an eNodeB 11010 provides cellular wireless communications for one or more cellular wireless devices in the form of UEs 11030. In some examples, the UEs 11030 may utilize the cellular network provided by the eNodeB 11010 to access a network, such as the internet 11060. The cellular wireless communications may be according to one or more wireless standards such as LTE. Cellular wireless devices 11010 and 11030 may include the components of FIG. 10 and FIG. 12, as well as implementing any one or more of the methods or timelines shown in FIGS. 1-9. The cellular wireless devices 11010 and 11030 may communicate on the licensed or unlicensed frequencies. Wireless device 11050 (e.g., a laptop computer) may access one or more local area networks provided by a wireless device 11040 (e.g., an access point) which may operate in the unlicensed frequencies. Wireless device 11050 may access the network, such as the internet 11060 through the wireless connection with wireless device 11040.

Figure 12:
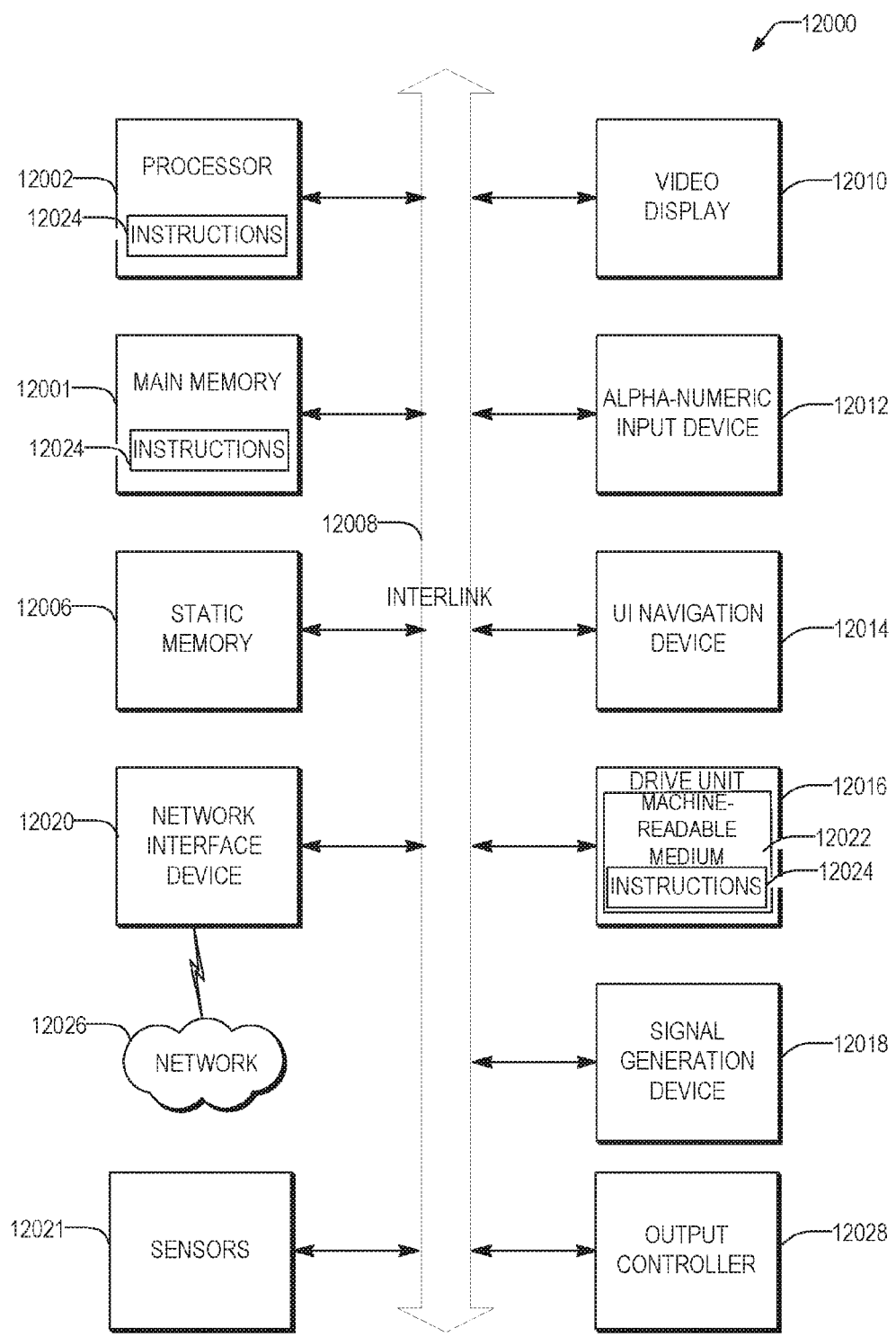
FIG. 12 shows a block diagram of an example machine upon which any one or more of the techniques (e.g., methodologies) discussed herein may be performed according to some examples of the present disclosure.

FIG. 12 illustrates a block diagram of an example machine 12000 upon which any one or more of the techniques (e.g., methodologies) discussed herein may be performed. In alternative embodiments, the machine 12000 may operate as a standalone device or may be connected (e.g., networked) to other machines. In a networked deployment, the machine 12000 may operate in the capacity of a server machine, a client machine, or both in server-client network environments. In an example, the machine 12000 may act as a peer machine in peer-to-peer (P2P) (or other distributed) network environment. The machine 12000 may be a cellular wireless device, a wireless device, or the like. Example cellular wireless devices include an eNodeB, a UE, a personal computer (PC), a tablet PC, a set-top box (STB), a personal digital assistant (PDA), a mobile telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, circuitry, or mechanisms. Modules and circuitry are tangible entities (e.g., hardware) capable of performing specified operations and may be configured or arranged in a certain manner. In an example, circuits may be arranged (e.g., internally or with respect to external entities such as other circuits) in a specified manner as circuitry. In an example, the whole or part of one or more computer systems (e.g., a standalone, client, or server computer system) or one or more hardware processors may be configured by firmware or software (e.g., instructions, an application portion, or an application) as circuitry that operates to perform specified operations.

Accordingly, the term "circuitry" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which circuitry is temporarily configured, each of the circuits need not be instantiated at any one moment in time. For example, where the circuits comprise a general-purpose hardware processor configured using software, the general-purpose hardware processor may be configured as respective different circuitry at different times. Software may accordingly configure a hardware processor, for example, to constitute a particular circuit at one instance of time and to constitute a different circuit at a different instance of time.

The machine (e.g., computer system) 12000 may include a hardware processor 12002 (e.g., a central processing unit (CPU), a graphics processing unit (GPU), a hardware processor core, or any combination thereof), a main memory 12001, and a static memory 12006, some or all of which may communicate with each other via an interlink (e.g., bus) 12008. The machine 12000 may further include a display unit 12010, an alphanumeric input device 12012 (e.g., a keyboard), and a user interface (UI) navigation device 12014 (e.g., a mouse). In an example, the display unit 12010, alphanumeric input device 12012, and UI navigation device 12014 may be a touch screen display. The machine 12000 may additionally include a storage device (e.g., drive unit) 12016, a signal generation device 12018 (e.g., a speaker), a network interface device 12020, and one or more sensors 12021, such as a global positioning system (GPS) sensor, compass, accelerometer, or other sensor. The machine 12000 may include an output controller 12028, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 12016 may include a machine readable medium 12022 on which is stored one or more sets of data structures or instructions 12024 (e.g., software) embodying or utilized by any one or more of the techniques or functions described herein. The instructions 12024 may also reside, completely or at least partially, within the main memory 12001, within the static memory 12006, or within the hardware processor 12002 during execution thereof by the machine 12000. In an example, one or any combination of the hardware processor 12002, the main memory 12001, the static memory 12006, or the storage device 12016 may constitute machine readable media.

While the machine readable medium 12022 is illustrated as a single medium, the term "machine readable medium" may include a single medium or multiple media (e.g., a centralized or distributed database, and/or associated caches and servers) configured to store the one or more instructions 12024.

The term "machine readable medium" may include any medium that is capable of storing, encoding, or carrying instructions for execution by the machine 12000 and that cause the machine 12000 to perform any one or more of the techniques of the present disclosure, or that is capable of storing, encoding, or carrying data structures used by or associated with such instructions. A machine readable medium may include a non-transitory machine readable medium. A machine-readable medium is not a transitory propagating signal. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. The instructions 12024 may further be transmitted or received over a communications network 12026 using a transmission medium via the network interface device 12020 utilizing any one of a number of transfer protocols (e.g., frame relay, internet protocol (IP), transmission control protocol (TCP), user datagram protocol (UDP), hypertext transfer protocol (HTTP), and the like). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi®, IEEE 802.16 family of standards known as WiMax®), IEEE 802.15.4 family of standards, and peer-to-peer (P2P) networks, among others. In an example, the network interface device 12020 may include one or more physical jacks (e.g., Ethernet, coaxial, or phone jacks) or one or more antennas to connect to the communications network 12026.

In an example, the network interface device 12020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 12000, and includes digital or analog communications signals or other intangible media to facilitate communication of such software.

OTHER NOTES AND EXAMPLES

Example 1 includes subject matter (such as a device, apparatus, or machine) comprising: a first transceiver to transmit and receive in an unlicensed channel; a second transceiver to transmit and receive in a licensed channel and in the unlicensed channel according to a cellular wireless protocol; and a controller to: sense, via the first transceiver, an energy of the unlicensed channel over a predetermined number of one or more slots to determine that the unlicensed channel is unoccupied, the slots defined with reference to timing information of the cellular wireless protocol, and in response to determining that the channel is unoccupied: schedule, via a control channel transmitted on the licensed channel, at least one User Equipment (UE) serviced by the eNodeB to receive data in the unlicensed channel; and transmit the data over the unlicensed channel starting at a cellular subframe boundary via the second transceiver.

In Example 2, the subject matter of Example 1 may include, wherein the first transceiver is configured to transmit and receive according to a non-cellular wireless protocol, and wherein the data transmitted over the unlicensed channel is a Supplemental Downlink (SDL) Physical Downlink Shared Channel (PDSCH), and wherein the controller is further configured to send a wireless reservation message on the unlicensed channel via the first transceiver to reserve the unlicensed channel for the data transmitted over the unlicensed channel.

In Example 3, the subject matter of any one of Examples 1 to 2 may include, wherein the one or more slots are configured to subdivide a plurality of samples in a current cellular subframe such that the one or more slots do not cross a symbol boundary in the current cellular subframe.

In Example 4, the subject matter of any one of Examples 1 to 3 may include, wherein at least one of the one or more slits is configured to cross a symbol boundary of a current cellular subframe.

In Example 5, the subject matter of any one of Examples 1 to 4 may include, wherein the one or more slits are punctured from a current cellular subframe.

In Example 6, the subject matter of any one of Examples 1 to 5 may include, wherein the cellular wireless protocol is a Long Term Evolution (LTE) or Long Term Evolution-Advanced (LTE-A) family of Standards defined by the Third Generation Partnership (3GPP).

In Example 7, the subject matter of any one of Examples 1 to 6 may include, wherein the first transceiver is configured to transmit and receive according to an Institute for Electrical and Electronics Engineers (IEEE) 802.11 protocol.

In Example 8, the subject matter of any one of Examples 1 to 7 may include, wherein the controller is to implement a backoff process, and is to refrain from transmitting the data on the unlicensed channel until the backoff process is successful.

In Example 9, the subject matter of any one of Examples 1 to 8 may include, wherein control channel is a Physical Downlink Control Channel (PDCCH) and wherein the controller is to: predict that a backoff process will complete before an end of a transmission of the PDCCH, and in response, schedule the at least one User Equipment (UE) serviced by the eNodeB to receive data on unlicensed channel via the PDCCH on the licensed channel transmitted by the second transceiver prior to completion of the backoff process.

In Example 10, the subject matter of any one of Examples 1 to 9 may include, wherein the controller is to: determine that the backoff process did not complete before the end of the transmission of the PDCCH, and in response: ignore a Hybrid Automatic Repeat Requests (HARQ) for data scheduled on the unlicensed channel; and notify the UE to clear a HARQ buffer for data scheduled on the unlicensed channel.

In Example 11, the subject matter of any one of Examples 1 to 10 may include, wherein the second transceiver is configured to provide a PDSCH in a licensed channel.

Example 12 includes subject matter (such as a device, apparatus, or machine) comprising: sense a secondary channel that is not exclusively licensed for cellular wireless communications over one or more slits; determine that a received power of the secondary channel indicates that the secondary channel is idle during the one or more slits; and in response: send a reservation message on the secondary channel; schedule at least one User Equipment (UE) to receive data on a Physical Downlink Shared Channel (PDSCH) transmitted on the secondary channel; communicate the schedule to the UE via a control channel on a primary channel that is licensed for cellular wireless communications; and transmit the PDSCH over the secondary channel beginning at a subframe boundary.

In Example 13, the subject matter of Example 12 may include, wherein the one or more slits are defined with reference to timing information of a cellular wireless protocol.

In Example 14, the subject matter of any one of Examples 12 to 13 may include, wherein the instructions configure the eNodeB to: determine that a backoff process will complete after a current subframe and during a next subframe, the next subframe beginning at the subframe boundary; and responsive to determining that the backoff process will complete after the current subframe and during the next subframe, schedule the at least one UE prior to the completion of the backoff process on a Physical Downlink Control Channel (PDCCH) transmitted on the primary channel.

In Example 15, the subject matter of any one of Examples 12 to 14 may include, wherein the instructions further configure the eNodeB to successfully complete a backoff procedure prior to transmitting the PDSCH over the primary channel.

In Example 16, the subject matter of any one of Examples 12 to 15 may include, wherein the instructions for the backoff procedure comprise instructions to: generate a random contention window; channel sense for a second predetermined period of time equal to a slit for each contention window; and determine that the backoff procedure was successful by determining that for each particular contention window, a received power during that particular contention window was below a predetermined threshold.

In Example 17, the subject matter of any one of Examples 12 to 16 may include, wherein the instructions for the backoff procedure comprise instructions to: determine that the secondary channel is congested, and in response, doubling the contention window.

Example 18 includes subject matter (such as a device, apparatus, or machine) comprising: one or more processors to: determine that a power level of a first channel over one or more slits is below a first predetermined threshold, the first channel being a wireless channel that is not exclusively licensed for cellular wireless, and in response: select a random backoff window; determine that the power level of the first channel for the backoff window is below a second predetermined threshold; schedule a User Equipment (UE) to receive data on a Supplemental Downlink (SDL) Physical Downlink Shared Channel (PDSCH) on the first channel using a control channel on a second, licensed channel; and transmit the SDL PDSCH over the first channel at a cellular subframe boundary responsive to the power level of the first channel for the random backoff window is below the second threshold.

In Example 19, the subject matter of Example 18 may include wherein the one or more processors are configured to provide a PDSCH on the second channel.

In Example 20, the subject matter of any one of Examples 18 to 19 may include, wherein the one or more slits are aligned with respect to a Long Term Evolution (LTE) or Long Term Evolution-Advanced (LTE-A) symbol.

In Example 21, the subject matter of any one of Examples 18 to 20 may include, wherein a duration in symbols of one or more slits are a consistent number of samples and are a factor of the number of samples in an Long Term Evolution (LTE) or Long Term Evolution-Advanced (LTE-A) subframe.

In Example 22, the subject matter of any one of Examples 18 to 21 may include, wherein the one or more processors are configured to send a wireless reservation message in response to the determination that the power level of the first channel for the backoff window is below the second threshold.

In Example 23, the subject matter of any one of Examples 18 to 22 may include, wherein the wireless reservation message is a Clear To Send (CTS) message and wherein the CTS message has a duration field that is set to a value that is at least a time until the cellular subframe boundary plus a time to transmit a PDSCH subframe.

In Example 24, the subject matter of any one of Examples 18 to 23 may include, wherein the one or more processors are configured to determine that the power level of the first channel for the random backoff window is below the second threshold by at least being configured to determine that for each decrement of the random backoff window that a received power is below the second threshold.

In Example 25, the subject matter of any one of Examples 18 to 24 may include, an antenna.

Example 26 includes subject matter (such as a method, means for performing acts, machine readable medium including instructions that when performed by a machine cause the machine to performs acts, or an apparatus to perform) comprising: using one or more processors to: determine that a power level of a first channel over one or more slits is below a first predetermined threshold, the first channel being a wireless channel that is not exclusively licensed for cellular wireless, and in response: select a random backoff window; determine that the power level of the first channel for the backoff window is below a second predetermined threshold; schedule a User Equipment (UE) to receive data on a Supplemental Downlink (SDL) Physical Downlink Shared Channel (PDSCH) on the first channel using a control channel on a second, licensed channel; and transmit the SDL PDSCH over the first channel at a cellular subframe boundary responsive to the power level of the first channel for the random backoff window is below the second threshold.

In Example 27, the subject matter of Example 26 may include, wherein the one or more processors are configured to provide a PDSCH on the second channel.

In Example 28, the subject matter of any one of Examples 26 to 27 may include, wherein the one or more slits are aligned with respect to a Long Term Evolution (LTE) or Long Term Evolution-Advanced (LTE-A) symbol.

In Example 29, the subject matter of any one of Examples 26 to 28 may include, wherein a duration in symbols of one or more slits are a consistent number of samples and are a factor of the number of samples in an Long Term Evolution (LTE) or Long Term Evolution-Advanced (LTE-A) subframe.

In Example 30, the subject matter of any one of Examples 26 to 29 may include, wherein the one or more processors are configured to send a wireless reservation message in response to the determination that the power level of the first channel for the backoff window is below the second threshold.

In Example 31, the subject matter of any one of Examples 26 to 30 may include, wherein the wireless reservation message is a Clear To Send (CTS) message and wherein the CTS message has a duration field that is set to a value that is at least a time until the cellular subframe boundary plus a time to transmit a PDSCH subframe.

In Example 32, the subject matter of any one of Examples 26 to 31 may include, wherein the one or more processors are configured to determine that the power level of the first channel for the random backoff window is below the second threshold by at least being configured to determine that for each decrement of the random backoff window that a received power is below the second threshold.

Example 33 includes subject matter (such as a device, apparatus, or machine) comprising: means for determining that a power level of a first channel over one or more slits is below a first predetermined threshold, the first channel being a wireless channel that is not exclusively licensed for cellular wireless, and in response: select a random backoff window; means for determining that the power level of the first channel for the backoff window is below a second predetermined threshold; means for scheduling a User Equipment (UE) to receive data on a Supplemental Downlink (SDL) Physical Downlink Shared Channel (PDSCH) on the first channel using a control channel on a second, licensed channel; and means for transmitting the SDL PDSCH over the first channel at a cellular subframe boundary responsive to the power level of the first channel for the random backoff window is below the second threshold.

In Example 34, the subject matter of Example 33 may include, means for providing a PDSCH on the second channel.

In Example 35, the subject matter of any one of Examples 33 to 34 may include, wherein the one or more slits are aligned with respect to a Long Term Evolution (LTE) or Long Term Evolution-Advanced (LTE-A) symbol.

In Example 36, the subject matter of any one of Examples 33 to 35 may include, wherein a duration in symbols of one or more slits are a consistent number of samples and are a factor of the number of samples in an Long Term Evolution (LTE) or Long Term Evolution-Advanced (LTE-A) subframe.

In Example 37, the subject matter of any one of Examples 33 to 36 may include, means for sending a wireless reservation message in response to the determination that the power level of the first channel for the backoff window is below the second threshold.

In Example 38, the subject matter of any one of Examples 33 to 37 may include, wherein the wireless reservation message is a Clear To Send (CTS) message and wherein the CTS message has a duration field that is set to a value that is at least a time until the cellular subframe boundary plus a time to transmit a PDSCH subframe.

In Example 39, the subject matter of any one of Examples 33 to 38 may include, wherein the means for determining that the power level of the first channel for the random backoff window is below the second threshold comprises means for determining that for each decrement of the random backoff window that a received power is below the second threshold.

What is claimed is:

1. An apparatus of an eNodeB, the apparatus comprising:
memory; and
processing circuitry, configured to:
sense that an unlicensed channel is idle for a first duration;
initialize a counter to a random number;
when the unlicensed channel being sensed is idle for the first duration, decrement the counter each time the unlicensed channel is sensed as idle for at least a second duration, until the counter is zero, the second duration defined with reference to a time period of a cellular protocol of a licensed channel;
in response to a determination that the counter is zero, schedule a User Equipment (UE) on a Physical Downlink Control Channel (PDCCH) to receive data on a Physical Downlink Shared Channel (PDSCH) transmitted in the unlicensed channel; and
encode a Physical Downlink Shared Channel (PDSCH) for transmission in the unlicensed channel.

2. The apparatus of claim 1, wherein the processing circuitry is to determine when the unlicensed channel was idle by comparing a received power on the unlicensed channel to a threshold.

3. The apparatus of claim 1, wherein the processing circuitry is to: in response to a determination that the unlicensed channel was not idle for the second duration, determine that the unlicensed channel is idle for the first duration again and in response, continuing to sense the unlicensed channel for the second duration.

4. The apparatus of claim 1, wherein the first duration is defined with respect to a time period of the cellular protocol of the licensed channel and is selected such that there is a whole number N of first duration time periods in a cellular sub frame.

5. The apparatus of claim 4, wherein the first duration is N number of slits.

6. The apparatus of claim 1, wherein the processing circuitry is to transmit a wireless reservation message on the unlicensed channel prior to transmitting the PDSCH.

7. An eNodeB comprising:
transceiver circuitry including a processor to perform operations to:
sense that an unlicensed channel is idle for a first duration;
in response to the unlicensed channel being sensed as idle during the first duration, set a variable to a randomly generated value between a minimum value and a maximum value;
sense the unlicensed channel for a predetermined duration, the predetermined duration defined with reference to a cellular protocol operating on a licensed channel;
perform a determination of whether the unlicensed channel was idle for the predetermined duration, and in response to a determination that the unlicensed channel was idle for the predetermined duration;
perform a determination of whether the variable is zero;
in response to a determination that the variable is zero transmit a Physical Downlink Shared Channel (PDSCH) in the unlicensed channel; and
in response to a determination that the variable is not zero, decrement the variable and repeat the operations of sensing the unlicensed channel for the predetermined duration and determining whether the unlicensed channel was idle until the variable is zero.

8. The eNodeB of claim 7, wherein the transceiver circuitry is to determine if the unlicensed channel was idle by comparing a received power on the unlicensed channel to a threshold.

9. The eNodeB of claim 7, wherein the transceiver circuitry is to: in response to a determination that the unlicensed channel was not idle for the predetermined duration, sense the unlicensed channel for the first duration again.

10. The eNodeB of claim 9, wherein the transceiver circuitry determines that the unlicensed channel is idle for the first duration when the unlicensed channel is sensed for the first duration again, and responsive to the determination that the unlicensed channel is idle for the first duration, continuing the operations of:
perform a determination of whether the variable is zero;
in response to a determination that the variable is zero, transmit a Physical Downlink Shared Channel (PDSCH) in the unlicensed channel; and
in response to a determination that the variable is not zero, decrement the variable and repeat the operations of sensing the unlicensed channel for the predetermined duration and determining whether the unlicensed channel was idle.

11. The eNodeB of claim 9, wherein the transceiver circuitry determines that the unlicensed channel is not idle during the first duration, and in response, sensing the unlicensed channel again for the first duration.

12. The eNodeB of claim 7, wherein the responsive to a determination that the variable is zero, the transceiver circuitry is to schedule a UE on a Physical Downlink Control Channel (PDCCH) to receive data on the PDSCH transmitted in the unlicensed channel.

13. The eNodeB of claim 12, wherein the PDCCH is transmitted on the licensed channel.

14. A non-transitory machine readable medium, including instructions, which when executed cause circuitry on an eNodeB to perform operations to:
sense that an unlicensed channel is idle for a first duration;
initialize a counter to a random number;
when the unlicensed channel being sensed is idle for the first duration, decrement the counter each time the unlicensed channel is sensed as idle for at least a second duration, until the counter is zero, the second duration defined with reference to a cellular protocol operating on a licensed channel; and
in response to a determination that the counter is zero, encode a Physical Downlink Shared Channel (PDSCH) for transmission in the unlicensed channel.

15. The machine readable medium of claim 14, wherein in response to a determination that the unlicensed channel was not idle for the second duration, the operations comprise operations to determine that the unlicensed channel is idle for first duration again prior to continuing to sense the unlicensed channel for the second duration.

16. The machine readable medium of claim 14, wherein the PDSCH is transmitted on the licensed channel.

17. The machine readable medium of claim 14, wherein the operations comprise operations to transmit a wireless reservation message on the unlicensed channel prior to transmitting the PDSCH.

18. The machine readable medium of claim 14 wherein the second duration is a slit.

19. The machine readable medium of claim 18, wherein the slit is punctured from a current cellular subframe.

20. The machine readable medium of claim 14, wherein the unlicensed channel is in an industrial, Scientific, and Medical band of frequencies.

* * * * *